United States Patent
Bunel et al.

(10) Patent No.: US 12,504,328 B2
(45) Date of Patent: Dec. 23, 2025

(54) INFRARED DETECTOR FORMING METHOD AND ASSOCIATED INFRARED DETECTOR

(71) Applicant: MSG Lithoglas GmbH, Dresden (DE)

(72) Inventors: David Bunel, Moirans (FR); Ulli Hansen, Berlin (DE); Simon Maus, Berlin (DE)

(73) Assignees: MSG Lithoglas GmbH, Dresden (DE); LYNRED, Palaiseau (FR)

( * ) Notice: Subject to any disclaimer, the term of this patent is extended or adjusted under 35 U.S.C. 154(b) by 114 days.

(21) Appl. No.: 18/025,940

(22) PCT Filed: Aug. 4, 2021

(86) PCT No.: PCT/EP2021/071737
§ 371 (c)(1),
(2) Date: Mar. 13, 2023

(87) PCT Pub. No.: WO2022/058087
PCT Pub. Date: Mar. 24, 2022

(65) Prior Publication Data
US 2023/0384164 A1  Nov. 30, 2023

(30) Foreign Application Priority Data

Sep. 17, 2020 (EP) .................... 20196661

(51) Int. Cl.
*G01J 5/20* (2006.01)
*B81B 7/00* (2006.01)
(Continued)

(52) U.S. Cl.
CPC .............. *G01J 5/20* (2013.01); *B81B 7/0067* (2013.01); *B81C 1/00317* (2013.01);
(Continued)

(58) Field of Classification Search
CPC .......... G01J 5/20; G01J 5/0875; G01J 5/0879; B81B 7/0067; B81C 1/00317
See application file for complete search history.

(56) References Cited

U.S. PATENT DOCUMENTS 5,895,233 A   4/1999  Higashi et al.
5,981,945 A * 11/1999  Spaeth .................. H10F 77/407
                                                    257/E31.127
(Continued)

FOREIGN PATENT DOCUMENTS

EP   2613181 A1   7/2013

OTHER PUBLICATIONS

International Search Report and Written Opinion issued in International Patent Application No. PCT/EP2021/071737, mailed Mar. 9, 2021.

*Primary Examiner* — Edwin C Gunberg
*Assistant Examiner* — Richard O Toohey
(74) *Attorney, Agent, or Firm* — MARSHALL, GERSTEIN & BORUN LLP

(57) ABSTRACT

A method of forming an infrared detector includes defining an optical window in a cover substrate. Defining the optical window includes forming a multilayer interference filter or a periodic diffraction grating on an upper surface of the optical window and a periodic diffraction grating on the lower surface of the optical window. The method also includes performing anodic bonding of a spacer onto the cover substrate, transferring the cover substrate provided onto a base substrate, and hermetically bonding the spacer onto the base substrate.

12 Claims, 6 Drawing Sheets

(51) Int. Cl.
*B81C 1/00* (2006.01)
*G01J 5/08* (2022.01)
*G01J 5/0875* (2022.01)

(52) U.S. Cl.
CPC .......... *G01J 5/0875* (2013.01); *G01J 5/0879* (2022.01); *B81B 2201/0207* (2013.01); *B81C 2203/0109* (2013.01); *B81C 2203/031* (2013.01)

(56) References Cited

U.S. PATENT DOCUMENTS

| | | | |
|---|---|---|---|
| 6,586,831 B2 | 7/2003 | Gooch et al. | |
| 7,148,480 B2 * | 12/2006 | Zhan | C03C 14/006 |
| | | | 264/1.21 |
| 7,375,331 B2 | 5/2008 | Schimert et al. | |
| 9,156,679 B1 * | 10/2015 | Zeyen | H10F 71/00 |
| 2013/0020297 A1 * | 1/2013 | Gupta | B23K 26/1224 |
| | | | 219/121.72 |
| 2013/0175449 A1 * | 7/2013 | Favier | G01J 5/0803 |
| | | | 250/339.01 |
| 2013/0307147 A1 * | 11/2013 | Liu | H01L 23/49811 |
| | | | 257/737 |
| 2017/0328779 A1 | 11/2017 | Carlson et al. | |
| 2019/0341419 A1 | 11/2019 | Kropelnicki et al. | |
| 2020/0249380 A1 * | 8/2020 | Pindl | B81C 1/00317 |

* cited by examiner

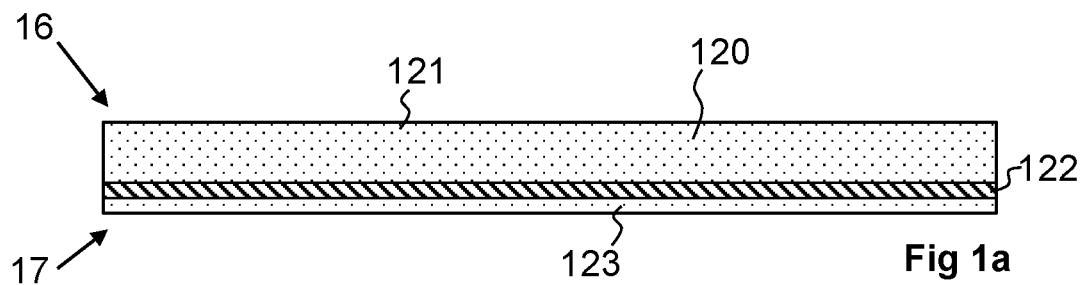
Fig 1a
Fig 1b
Fig 1c
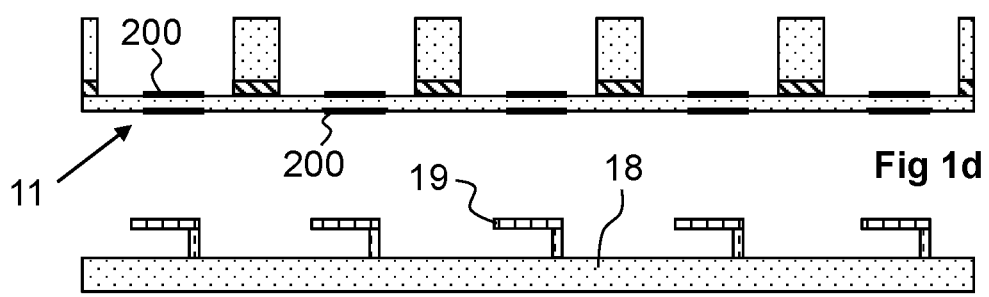
Fig 1d
Fig 1e
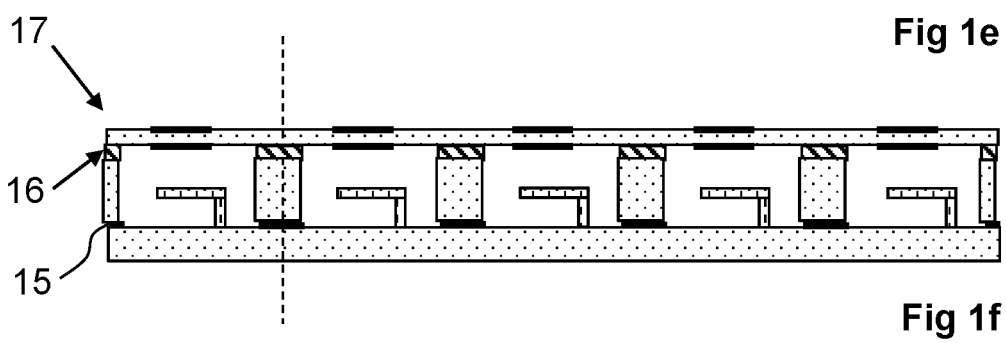
Fig 1f
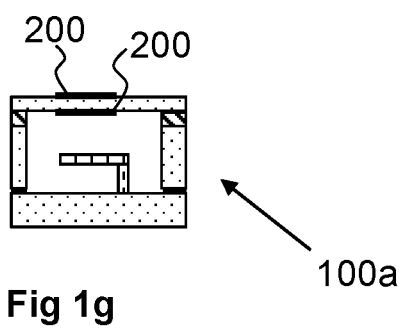
Fig 1g

INFRARED DETECTOR FORMING METHOD AND ASSOCIATED INFRARED DETECTOR

TECHNOLOGICAL FIELD

The invention concerns the technical field of infrared detection, and particularly detection implementing microbolometers. The invention concerns a method of forming an infrared detector as well as the associated infrared detector.

In the sense of the invention, an infrared detector or sensor is formed of elementary detection elements conventionally appearing in the form of an array of such elements. Thus, the elementary infrared detectors form the pixels of an infrared image obtained from the infrared sensor.

More particularly, the invention aims at obtaining an infrared detector with a small effective detection surface area without decreasing the performance level.

BACKGROUND

An infrared detector conventionally appears in the form of a microbolometer suspended on a base substrate, and encapsulated in a hermetic package. The hermetic package is generally defined by a cover and lateral walls affixed between the base substrate and the cover. The cover is transparent in the wavelength range of interest, typically between 2 and 14 micrometers, while an infrared detector is generally sensitive in the wavelength range between 8 and 14 micrometers.

To improve the performance of the infrared detector, an optical window is structured in the cover opposite the microbolometer(s). The optical window is provided with a filter configured to attenuate wavelengths in the range from 2 to 8 micrometers, so that the microbolometer only captures wavelengths of interest between 8 and 14 micrometers.

Further, the performance of the infrared detector is also dependent on the vacuum level within the hermetic package. To guarantee the thermal insulation between the microbolometer and the lower substrate, necessary to obtain the expected performance, the vacuum level in the hermetic package should typically be lower than $10^{-3}$ mbar. This vacuum level is conventionally obtained by one or a plurality of getters deposited on the substrates or the walls outside of the optical window.

It should be noted that the vacuum level also depends on the volume of the hermetic package. Indeed, microbolometer manufacturing techniques cause the absorption or trapping of molecules in the base substrate and the microbolometer. The molecules are then desorbed during the sealing of the hermetic package and cause a degradation of the vacuum level.

The quantity of the desorbed molecules has an increasing proportion in the volume defined by the hermetic package as said volume decreases. Indeed, part of the desorbed molecules cannot be decreased by a decrease in the microbolometer size. Thus, for a constant height of the hermetic package, the decrease of the detection surface of an infrared detector, typically to form pixels of lower dimensions, causes a degradation of the vacuum level in the hermetic package. This results in a degradation of the performance of the infrared detector.

Further, there exist different methods enabling to form the cavity of an infrared detector. Generally, two techniques can be distinguished to form the cover: a monolithic technique using multiple sacrificial layers to deposit the cover, and a transfer technique using the transfer of a substrate forming the cover.

The monolithic technique comprises forming the microbolometer and the hermetic package on a single substrate by the use of one or a plurality of sacrificial layers.

The transfer technique comprises forming, on the one hand, the microbolometer suspended on a base substrate of the package and, on the other hand, the cover and the walls on a cover substrate. The cover substrate is then transferred and sealed onto the base substrate in a vacuum enclosure to form the hermetic package.

The present invention only concerns such a transfer technique. Such a manufacturing technique has for example been described in document U.S. Pat. No. 5,895,233, and then particularly developed in documents U.S. Pat. Nos. 6,586,831 and 7,375,331.

Nowadays, the most commonly used transfer technique is that described in document US 2017/328779 and illustrated in FIG. 1 of the state of the art. According to this technique, a cover substrate 120 is formed from a wafer of "SOI" type, for "Silicon on Insulator". As illustrated in FIG. 1a, cover substrate 120 primarily comprises a silicon layer 121 deposited on a thin insulator layer 122, itself deposited on a thin silicon layer 123. A first step, illustrated in FIG. 1b, comprises structuring silicon layer 121 by deep reactive ion etching to reach insulator layer 122, in order to delimit the walls of the hermetic package.

Insulator layer 122 is then removed, as illustrated in FIG. 1c, by a dry or wet etching at least in the portions of the hermetic package intended to come in front of the microbolometer. Silicon layer 123 is then cleaned before starting forming optical window 11 and the filter on optical window 11, as illustrated in FIG. 1d.

The filter is obtained by depositing on the two surfaces of optical window 11 a stack of germanium-zinc sulfide coatings, forming two multilayer interference filters 200. Each multilayer interference filter 200 exhibits an attenuation in the wavelength range between 2 and 8 micrometers, and the use of the two filters enables to increase the incident radiation filtering gain on optical window 11.

After having formed cover substrate 120, the latter is then transferred onto a base substrate 18, having microbolometers 19 suspended thereon, as illustrated in FIG. 1e. During the transfer, cover substrate 120 is flipped and surface 16 becomes the lower surface of cover substrate 120 while surface 17 becomes the upper surface of said substrate. The transfer step ends with the performing of a hermetic bonding between base substrate 18 and the walls formed by silicon layer 121, as illustrated in FIG. 1f. Base substrate 18 is generally made of silicon, so that the hermetic bonding is performed between two silicon layers by means of a bonding layer 15 made of gold-tin and heated up to a temperature in the range from 300 to 350° C.

With such a technique, a plurality of infrared detectors 100a may be simultaneously formed on a same wafer. The last step, illustrated in FIG. 1g, comprises diced base substrate 18 and cover substrate 120 carried out to separate the different infrared detectors 100a thus formed.

This technique, described in document US 2017/328779, however finds its limits since the thickness of silicon layer 121 is conventionally smaller than 75 micrometers in a "SOI"-type wafer. Thus, with a conventional "SOI" wafer, it is not possible to form a hermetic package with walls having a height greater than 75 micrometers, since silicon layer 121 is intended to form the walls of the hermetic package.

It would be possible to use a "SOI" wafer with a thicker silicon layer 121, for example, of 300 micrometers, but such "SOI" wafers are particularly expensive and complex to structure. Indeed, by using this type of "SOI" wafer, it would be necessary to machine a thicker silicon layer in order to reach insulating layer 122, thus causing a degradation of the structuring accuracy of the lower surface of the optical window.

Thereby, this technique thus does not enable to guarantee an acceptable level of vacuum, typically smaller than $10^{-3}$ mbar, for an infrared detector with a low detection surface area, since it is not economically possible to increase the height of the hermetic package beyond 75 micrometers. Further, such a technique uses an "SOI"-type wafer and a structuring process which are particularly expensive.

A more recent technique, for example, described in document WO 2019/154465 and illustrated in FIG. 2, comprises using a spacer having a height greater than 75 micrometers to form the walls of the hermetic package. With such a spacer, it is possible to implement a glass cover substrate 12 for example made of borosilicate glass. As illustrated in FIG. 2a, a first step comprises defining an optical window 11 and forming the two multilayer interference filters 200 on either side of optical window 11.

As described in reference with FIG. 1, each multilayer interference filter 200 exhibits an attenuation in the wavelength range between 2 and 8 micrometers, and the use of the two filters enables to increase the radiation incident filtering gain on optical window 11.

When optical window 11 and multilayer interference filters 200 are formed, a second step comprises performing an anodic bonding 13 of a spacer 14a made of silicon on cover substrate 12, as illustrated in FIG. 2b. Anodic bonding 13 requires a significant temperature rise, typically between 250° C. to 500° C., to obtain a bonding of silicon spacer 14a onto a glass cover substrate 12.

By using the same base substrate 18 as illustrated in FIG. 2c, it is possible to transfer spacer 14a and cover substrate 12 onto base substrate 18. A hermetic bonding is then performed, as illustrated in FIG. 2d, between spacer 14a and base substrate 18. A last step, illustrated in FIG. 2e, comprises dicing the wafer to separate the different infrared detectors 100b thus formed.

Although this technique enables to increase the height of the hermetic package by using a spacer 14a having a height greater than 75 micrometers, the anodic bonding operation 13 causes a significant temperature rise of cover substrate 12 and a risk of deterioration of the multilayer interference filters 200 present on either side of optical window 11. This results in a decrease in the performance of the infrared detector due to the degradation of the filtering present on optical window 11.

Thus, such a hermetic package manufacturing technique enables to maintain the volume of the hermetic package when the detection surface area is decreased by increasing the height of the cavity, but the performance of the infrared detector is also decreased due to the degradation of multilayer interference filters 200.

To partly solve this problem, it would be possible to bond the spacer onto the cover substrate before forming the multilayer interference filters on the optical window, so that the anodic bonding between the spacer and the cover substrate does not degrade the multilayer interference filters.

However, this solution renders complex the process-flow. Indeed, the forming of multilayer interference filters and the forming of anodic bonds implement two different techniques and very different production tools. Additionally, on the cavity side, multilayer deposition has to be done in the cavity bottom, which also renders complex the process.

Thus different entities currently form, on one hand, the multilayer interference filters and on the other hand, the anodic bonding. To form an infrared detector with a spacer bonded to the cover substrate before forming the multilayer interference filters, one should thus send to a first subcontractor the cover substrate for the performing of a first anodic bonding between the cover substrate and the spacer. The cover thus formed would be sent to a second subcontractor for the forming of the multilayer interference filters. Then, the cover thus formed should be sent back to the first subcontractor for the performing of the second bonding between the cover substrate and the base substrate. Conversely to the embodiment of FIG. 1 which requires a single shipping, such a solution would be more complex to implement in terms of logistics.

The technical problem that the invention intends to overcome is to form an infrared detector with a low detection surface area while keeping the current performance of infrared sensors and limiting logistics constraints.

SUMMARY OF THE DISCLOSURE

To solve this technical problem, the invention provides combining a multilayer interference filter or a periodic diffraction grating with a periodic diffraction grating, so that the latter is located on the surface of the cover substrate submitted to an anodic bonding with a spacer.

Indeed, the invention originates from an observation according to which a periodic diffraction grating is not altered during the temperature rise generated by an anodic bonding since the nature of a periodic diffraction grating is different from the nature of a multilayer interference filter.

Thus, by combining a periodic diffraction grating on the surface of the cover substrate having the spacer bonded thereto and a multilayer interference filter or a periodic diffraction grating deposited on the other surface of the cover substrate, it is possible to obtain an assembly resistant to the high bonding temperature induced by the anodic bonding process.

Thereby, the invention enables to implement a spacer with anodic bonds to increase the volume of a hermetic package without the risk of damaging the optical window. This technique of combination of a multilayer interference filter and of a periodic diffraction grating is further described in document EP 2 613 181 for a conventional application, that is, with no spacer, and for a unit package.

For this purpose, according to a first aspect, the invention concerns a method of forming an infrared detector comprising the steps of:

definition of an optical window in a first substrate, called cover substrate;

anodic bonding of a spacer onto a lower surface of said cover substrate at the periphery of said optical window to form the lateral walls of a package;

transfer of said cover substrate provided with said spacer onto a second substrate, called base substrate, having at least one microbolometer suspended thereon; and hermetic bonding of said spacer on said base substrate to form a hermetic package around said at least one microbolometer.

The invention is characterized in that the step of definition of the optical window comprises forming a multilayer interference filter or a periodic diffraction grating on an upper surface of said optical window, and a periodic diffraction grating on the lower surface of said optical window;

said multilayer interference filter or said periodic diffraction grating of the upper surface being configured to attenuate the incident radiation in a first wavelength interval in the range from 2 to x micrometers; said periodic diffraction grating of the lower surface being configured to attenuate the incident radiation in a second wavelength interval in the range from y to 8 micrometers; with x being in the range from 2 to 8 micrometers and y being smaller than or equal to x.

In other words, the invention lies in the combination of a cover substrate with an optical window comprising a first surface having a multilayer interference filter or a periodic diffraction grating and a second surface having a periodic diffraction grating, and a spacer bonded to the second surface by anodic bonding. When the first surface has a multilayer interference filter, the multilayer interference filter can be formed after the step of anodic bonding of the spacer onto the lower surface of the cover substrate.

The multilayer interference filter or the periodic diffraction grating of the upper surface and the periodic diffraction grating of the lower surface are configured to perform two distinct filterings of the incident radiation: a first filtering between 2 and x micrometers and a second filtering between y and 8 micrometers.

Considering x and y equal to 5, the upper surface filter attenuates the transmission of the optical window over a first wavelength range between 2 and 5 micrometers, and the lower surface filter attenuates the transmission of the optical window over a second wavelength range between 5 and 8 micrometers.

According to another example, considering x equal to 6 and y equal to 4, the upper surface filter attenuates the transmission of the optical window over a first wavelength range between 2 and 6 micrometers, and the lower surface filter attenuates the transmission of the optical window over a second wavelength range between 4 and 8 micrometers.

To obtain such a combination of the upper surface filter with the lower surface filter over the entire wavelength range between 2 and 8 micrometers, it is necessary for x to be in the range from 2 to 8 micrometers, and for y to be smaller than or equal to x.

The invention thus enables to form an infrared detector with a low footprint and high volume of the hermetic package by the height of the cavity, due to the use of a spacer, and while keeping the performance of the infrared detector, by the combination of the upper surface filter with the lower surface filter. For example, the spacer may have a height greater than 75 micrometers, or a height in the range from 150 to 250 micrometers, that is, a thickness greater than that capable of being obtained by a structuring of a "SOI"-type wafer such as described in document US 2017/328779 and illustrated in FIG. 1 of the state of the art.

The replacing of a multilayer interference filter by a periodic diffraction grating according to the invention, on at least one of the surfaces of an optical window of an infrared detector, enables to very substantially improve the industrial control of the quality of the assembly, that is, the density and the size of structural defects which disturb the propagation of the incident wavefront carrying the useful information.

Indeed, the forming of a multilayer interference filter on the upper surface may be obtained with a deposition step, for example, by forming a stack of germanium-zinc sulfide layers. However, the management of the defects of this deposition step is complex to control and the conventional use of a multilayer interference filter in the wavelength range between 2 and 8 micrometers requires using a complex know-how, so that the upper limit does not deteriorate the range of wavelengths captured by the microbolometer.

By decreasing the attenuation wavelength range of the upper surface filter between 2 and x micrometers, with x smaller than 8 micrometers, the constraints of the forming of the upper surface filter are greatly decreased and are transferred onto the filter of periodic diffraction grating type of the lower surface.

Periodic diffraction gratings may be formed by means of usual manufacturing techniques, and this, reproducibly and accurately. Particularly, the use of semiconductor substrates of semi-transparent germanium or silicon type enables to use technologies originating from microelectronics, including more particularly the forming of a mask of the grating defined by photolithography, and the forming of the raised or recessed patterns by methods of dry etching in a clean environment. Thus, the cover substrate is preferably made of silicon, since such manufacturing techniques are currently developed for this type of substrate.

Preferably, at least one periodic diffraction grating exhibits an Archimedean or Penrose lattice. Indeed, a hexagonal periodic diffraction grating induces an average 80% attenuation over the range from 5 to 8 micrometers, while a grating having an Archimedean tiling allows an average attenuation greater than 90%, or even 95%, over this same range. An advantageous symmetry of high order may be obtained if the grating comprises a mesh of "quasi-crystal" type.

For example, at least one periodic diffraction grating may correspond to a grating of two-dimensional patterns originating from Penrose tilings. These tilings exhibit periodically-repeated patterns, with a symmetry of order 5 or 10. Such gratings may be formed, for example, according to the method described by: "Construction de pavages du plan par la méthode des multi-grilles", Denis Gratias, LEM-CNRS/ONERA, 2002.

As a variation, at least one periodic diffraction grating may correspond to a grating of so-called Archimedean patterns, periodically repeated to form larger patterns, with a symmetry of order 12. Particularly, a periodic diffraction grating of patterns originating from an Archimedean tiling provides a transition of small width between the attenuated range and the transmitted range, that is, a width of approximately 2 micrometers for a cut-off around 8 micrometers.

Conversely, the cut-off band of a square mesh grating will extend over a larger spectral band, typically a width of approximately 2.5 micrometers for a cut-off around 8 micrometers.

As a result, the periodic grating of the lower surface may exhibit an efficient attenuation in the wavelength range between y and 8 micrometers.

Thus, the combination of a multilayer interference filter and of a periodic diffraction grating on the upper surface and of a periodic diffraction grating on the lower surface provides a good control and reproducibility of low-defectivity level much greater than what is typically achieved by the deposition of two multilayer interference filters.

In addition to the forming of the filter on the upper surface and of the periodic diffraction grating on the lower surface of the optical window, the optical window definition step may integrate a structuring of the cover substrate to decrease its thickness at the level of the optical window.

The invention originates from a surprising observation according to which the periodic diffraction grating more efficiently resists to the temperature rise consecutive to an anodic bonding than a multilayer interference filter. Further, the combination of a multilayer interference filter deposited after the anodic bonding and of a periodic diffraction grating deposited before the anodic bonding enables to limit the constraints of the forming of the multilayer interference filter. Preferably, the optical window has a thickness in the range from 700 to 800 micrometers.

The invention provides two embodiments, which differ by the nature of the used spacer: either the spacer is made of glass, or the spacer is made of silicon.

In a first embodiment, the spacer is made of glass and the hermetic bonding on the base substrate integrates a metal bonding, for example, a bonding obtained by means of a seal ring made of gold-tin and heated up to a temperature in the range from 300 to 350° C. In this first variant, a first subcontractor may form the periodic diffraction grating of the upper surface and the periodic diffraction grating of the lower surface before transmitting the cover substrate thus formed to a second subcontractor. The subcontractor may then perform the bonding of the spacer as well as the transfer and the bonding of the cover substrate to complete the infrared detector with a single shipping. The bonding of the cover substrate to the base substrate can be made by a metallic bonding. When the multilayer interference filter is formed on the upper surface, the second subcontractor sends the component when the cover substrate is bonded with the base substrate and the first substractor can then form the multilayer interference filter.

This first variant enables to obtain a specific infrared detector, with a spacer made of glass.

Thus, this specific infrared detector comprises:
- a base substrate having at least one microbolometer suspended thereon;
- walls formed by a spacer made of glass, bonded onto said base substrate; and
- a cover substrate bonded to said spacer by anodic bonding, said cover substrate having an optical window comprising:
  - a multilayer interference filter or a periodic diffraction grating arranged on an upper surface of said optical window; and
  - a periodic diffraction grating arranged on said lower surface of said optical window;
  - said multilayer interference filter or said periodic diffraction grating of said upper surface being configured to attenuate the incident radiation in a first wavelength interval in the range from 2 to x micrometers;
  - said periodic diffraction grating of said lower surface being configured to attenuate the incident radiation in a second wavelength interval in the range from y to 8 micrometers; with x smaller than 8 micrometers and y smaller than or equal to x.

Moreover, in this first embodiment, the spacer wafer can be structured before or after the anodic bonding of the spacer onto a lower surface of the cover substrate at the periphery of the optical window to form the lateral walls of a package. A laser structuration can be used to structure the spacer wafer before the anodic bonding and a wet etching can be used to structure the spacer after the anodic bonding.

In a second embodiment, the spacer is made of silicon and is bonded to the cover substrate via an insert. The spacer is bonded onto the lower surface of the cover substrate by means of an insert made of glass. For this purpose, the insert is deposited on the lower surface of the cover substrate before being bonded to the spacer by means of an anodic bonding, the hermetic bonding on the base substrate corresponding to a metal bonding. Alternatively, the insert made of glass is deposited on the spacer before being bonded to the cover substrate by means of an anodic bonding.

In this second embodiment, a first subcontractor may form the periodic diffraction grating of the upper surface and the periodic diffraction grating of the lower surface before transmitting the cover substrate thus formed to a second subcontractor. The second subcontractor may then perform the bonding of the spacer as well as the transfer and the metal bonding of the cover substrate to complete the infrared detector with a single shipping. When the multilayer interference filter is formed on the upper surface, the second subcontractor sends the component when the cover substrate is bonded with the base substrate and the first substractor can then form the multilayer interference filter.

This second embodiment enables to obtain another specific infrared detector, which has, like the infrared detector of the first embodiment, a spacer associated with an optical window having a multilayer interference filter or a periodic diffraction grating on the upper surface and a periodic diffraction grating on the lower surface.

Thus, this second specific infrared detector comprises:
- a base substrate having at least one microbolometer suspended thereon;
- walls formed by a spacer made of silicon, bonded on said base substrate;
- an insert made of glass bonded on said spacer; and
- a cover substrate bonded onto said insert by anodic bonding; said cover substrate having an optical window comprising:
  - a multilayer interference filter or a periodic diffraction grating arranged on an upper surface of said optical window; and
  - a periodic diffraction grating arranged on said lower surface of said optical window;
  - said multilayer interference filter or said periodic diffraction grating of said upper surface being configured to attenuate the incident radiation in a first wavelength interval in the range from 2 to x micrometers;
  - said periodic diffraction grating of said lower surface being configured to attenuate the incident radiation in a second wavelength interval in the range from y to 8 micrometers; with x smaller than 8 micrometers and y smaller than or equal to x.

The two above-identified embodiments enable to obtain a manufacturing method with low logistics constraints since a single shipping is necessary.

BRIEF DESCRIPTION OF THE DRAWINGS

The present invention will be better understood on reading of the following description provided as an example only in relation with the accompanying drawings, where the same reference numerals designate the same or similar elements, in which:

FIGS. 1a-1g illustrate the steps of formation of an infrared detector according to a first embodiment of the state of the art;

DETAILED DESCRIPTION

FIGS. 3a-3f illustrate a first embodiment of a method of forming an infrared detector 10a using a spacer 14a made of glass.

Figure 2A:
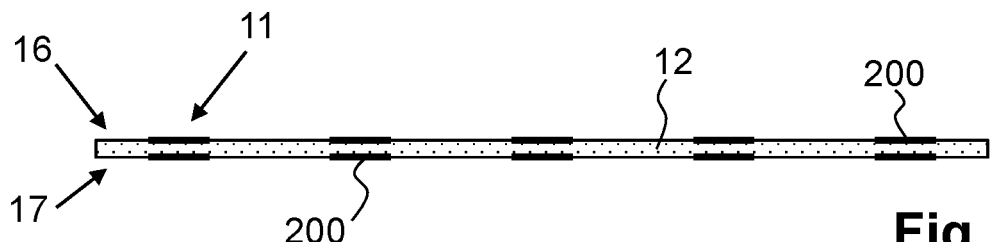
FIGS. 2a-2e illustrate the steps of formation of an infrared detector according to a second embodiment of the state of the art.
Figure 2B:
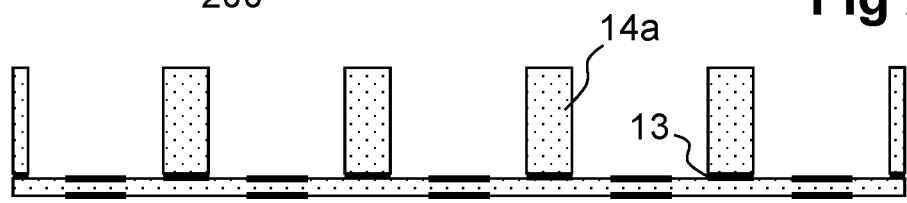
Figure 2C:
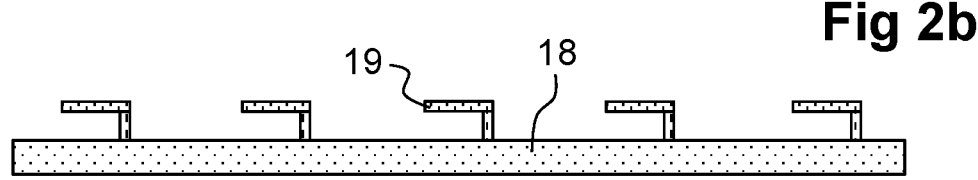
Figure 2D:
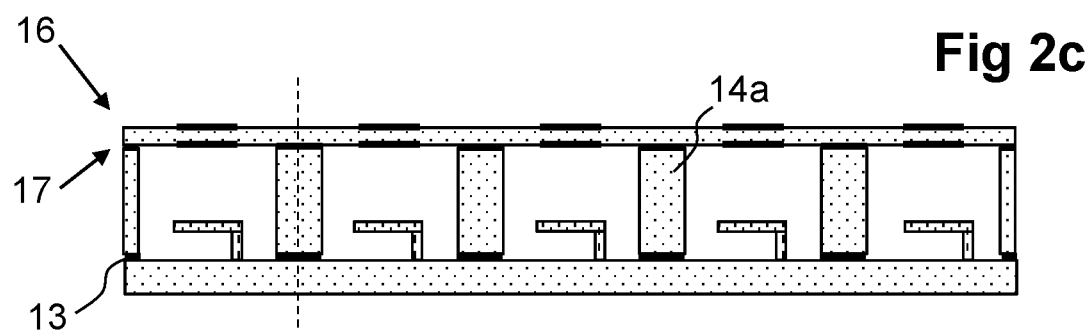
Figure 2E:
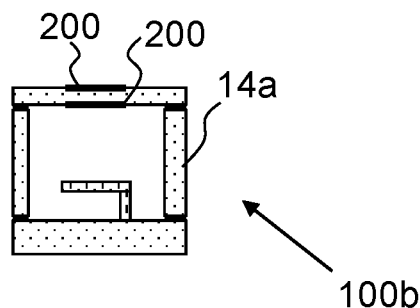
Figure 3A:
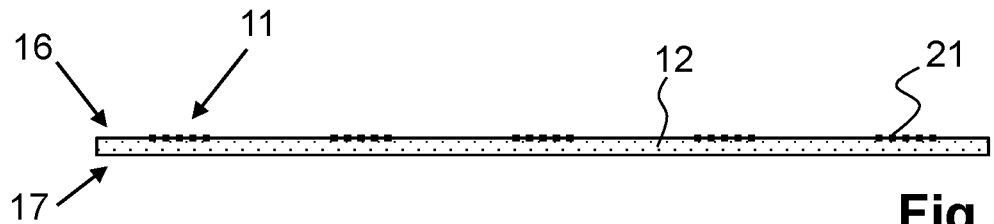
FIGS. 3a-3f illustrate the steps of formation of an infrared detector according to a first embodiment of the invention.
Figure 3B:
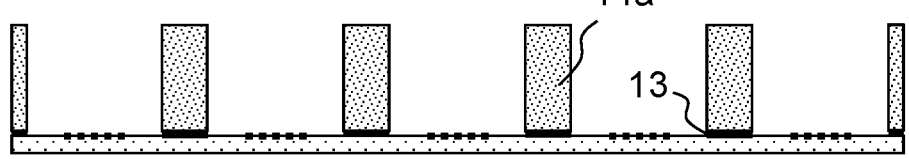
Figure 3C:
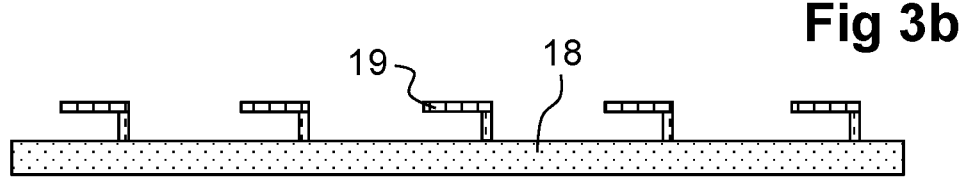
Figure 3D:
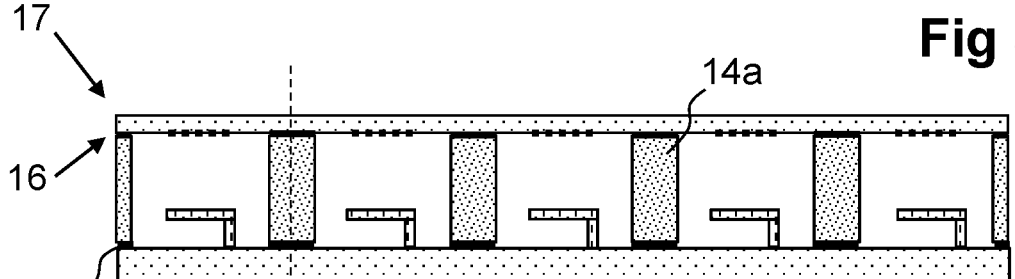
Figure 3E:
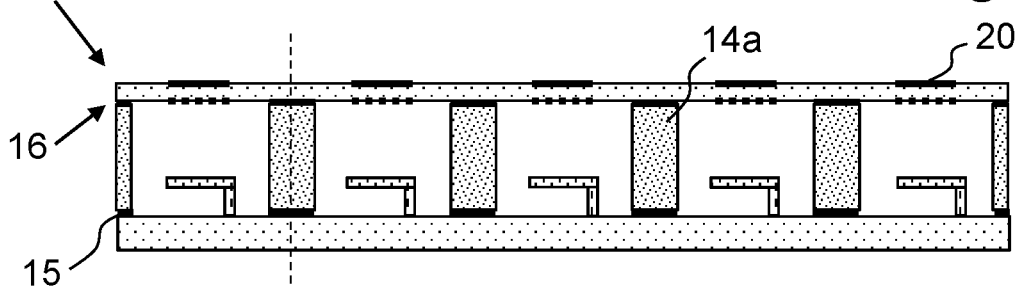

In FIG. 3e, the infrared bolometric detector 10a comprises a base substrate 18 comprising at its upper surface a read circuit, a sensitive retina, formed of a plurality of bolometric membranes 19 suspended above the read circuit by means of mechanical support, and thermal insulation arms. Membranes 19 each form a point of the detector sensitive to infrared radiation, especially of wavelength ranging between 8 micrometers and 14 micrometers. Retina is placed in focal plane of an optical system (not shown).

The read circuit is not differentiated from the base substrate 18 in FIG. 3e but may also be placed in the form of an electronic chip assembled on the internal surface of a bottom of a conventional package. The read circuit further comprises addressing and bias circuits (also not shown) necessary to the forming of the useful signals by means of membranes 19.

Detector 10a further comprises an optical window 11 formed on a cover substrate 12, located in front of retina and placed on the optical path between said retina and the base substrate 18. The distance between the cover substrate 12 and the base substrate 18 is obtained by a spacer 14a, made of glass in the embodiment of FIGS. 3a-3f.

The assembly formed of the base substrate 18, the cover substrate 12, and the spacer 14a forms a mechanical protection package for retina and defines a usually hermetic cavity under a reduced gas pressure.

As illustrated in FIG. 3a, the first step of the method of forming the infrared detector 10a involves the definition of the optical window 11 in the cover substrate 12. For instance, the optical window 11 has a thickness in the range from 700 to 800 micrometers. In this step, the cover substrate 12 is preferably flipped compared to the position of the cover substrate 12 when the cover substrate 12 is mounted on the base substrate 18.

Cover substrate 12 is formed in one piece and in a single mineral material, such as silicon or germanium, which provides both a good mechanical hold and a satisfactory capacity of hermetic integration to the spacer 14a, while enabling to texture its surface by means of photolithography and etch techniques.

Lower surface 16 of the cover substrate 12, that is, the surface closest to retina when the cover substrate 12 is mounted on the base substrate 18, is textured to have a periodic grating 21 of patterns forming a diffraction grating, for example, a grating of raised pads.

Diffraction grating 21 is designed to attenuate the general optical transmission of window 11 over a second wavelength range between y and 8 micrometers, with y smaller than or equal to x. More specifically, the properties of grating 21, that is, especially the geometry of its patterns, essentially their filling rate, and footprint p of the grating are selected so that the wavelengths comprised in the second range are deviated by a diffraction angle such that these wavelengths are not incident on retina. The energy thus diffracted is no longer transmitted along a optical axis of the detector 10a, but is deviated away from said optical axis according to high angles in the incident half-space, so that the radiation does not reach the focal plane at such wavelengths. The result in terms of image formed on the focal plane is equivalent to a severe transmission attenuation for this wavelength range.

The diffraction grating is advantageously formed by means of usual state-of-the-art photolithography and etching techniques which allow both a large-scale production and a high reproducibility, so that the size and the density of defects of the diffraction grating are very limited.

Advantageously, the optical properties of diffraction grating 21 are isotropic, to avoid being selective over a specific polarization of the radiation. Indeed, the radiation collected in most applications of infrared imaging type has no specific polarization feature.

For this purpose, grating 21 has a high symmetry, especially of order 4 or 6, that is, square or hexagonal, or higher orders. Of course, other layouts are possible if, conversely, a transmission/diffraction polarization anisotropy is desired, for example.

An advantage of a high symmetry also results from the fact that the attenuation of the intensity of the transmitted radiation corresponding to the diffraction by the grating, that is, the attenuation in the second portion of the filtered spectrum, very substantially increases with the order of symmetry of the grating. Thus, for example with y equal to 5, a hexagonal grating induces an average attenuation of 80% over the 5-8 micrometers range, while the grating having an archimedean tiling allows an average attenuation greater than 90%, or even 95%, over this same range.

An advantageous symmetry of high order may be obtained if grating 21 comprises a mesh of "quasi-crystal" type. For example, grating 21 is a two-dimensional grating of patterns resulting from Penrose tilings, such tilings having periodically repeated patterns with a symmetry of order 5 or 10. Such gratings may for example be constructed according to the method described by: "Construction de pavages du plan par la méthode des multi-grilles", Denis Gratias, LEM-CNRS/ONERA, 2002.

As a variation, grating 21 is a grating of so-called archimedean patterns, periodically repeated to form larger patterns having a symmetry of order 12.

Especially, a grating of patterns resulting from an archimedean tiling provides a transition of small width between the attenuated range and the transmitted range, that is, a width of approximately 2 micrometers for a cut-on around 8 micrometers. Conversely, the cut-on of a grating with square meshes will extend over a larger spectral band, typically with a width of approximately 2.5 micrometers for a cut-on around 8 micrometers.

A grating based on an archimedean tiling adapted to the present invention may be constructed as follows.

Figure 5:
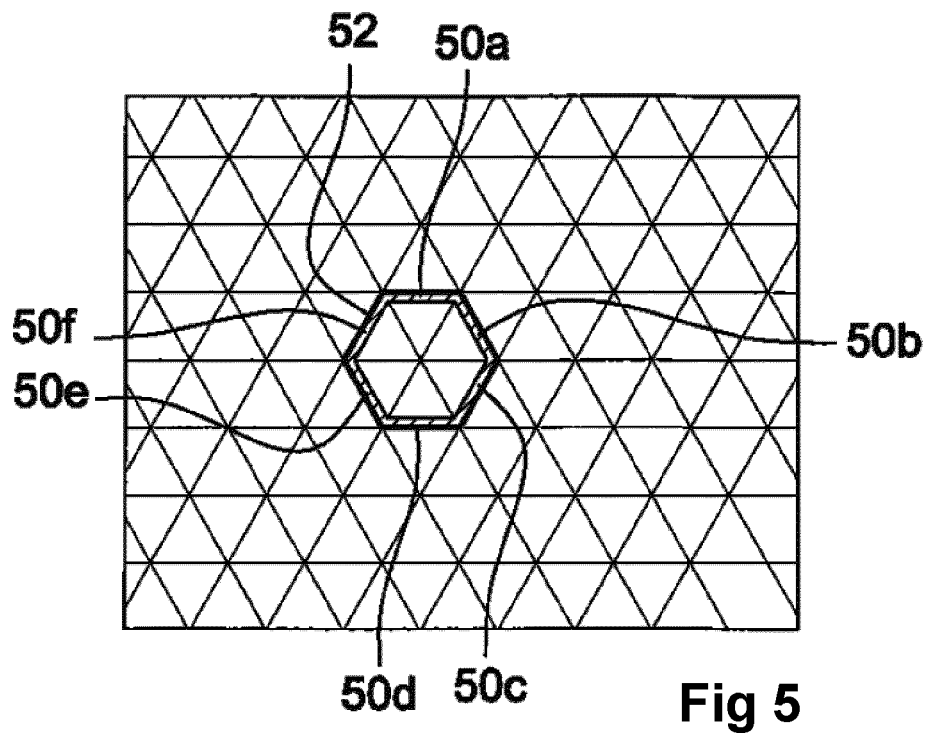
FIG. 5 is a hexagonal tiling used to define an archimedean tiling.

First, a set of equilateral triangles 50a-50f arranged to form a hexagon 52 (elementary archimedean pattern) is formed. Then, this elementary pattern is periodically repeated to form a first contiguous tiling such as shown in FIG. 5.

Three points are then defined on one of equilateral triangles 50a-50f of each hexagon 52 and are repeated by rotation around the rotation center corresponding to the center of the hexagon, on each triangle of each hexagon. By construction, the obtained point pattern has at least a symmetry of order 6. To simultaneously obtain a symmetry of order 4, the three previously mentioned points are specifically placed on the equilateral triangles.

A first point 54a is placed at the center of the elementary pattern, and the two other points 54b and 54c are respectively placed on the edges of the triangle having point 54a as an apex, equidistantly to center 54a, and to form a square pattern (symmetry of order 4) with corresponding points 56b and 56c of the adjacent elementary pattern. Distance p of points 54b and 54c to point 54a is thus equal to the distances between points 54b and 56b, as well as between points 54c and 56c.

By construction and by repeating of the positioning of these three points on each triangle as previously-described, and then by tiling of the plane with the hexagons thus obtained, the points form a grating of various patterns periodically repeated having symmetries of orders 1, 2, 3, 4, 6, and 12. Accordingly, the number of diffraction orders is higher than that of a conventional meshing, based on a square or hexagonal mesh, for example, having a symmetry limited to orders 4 or 6.

Figure 7:
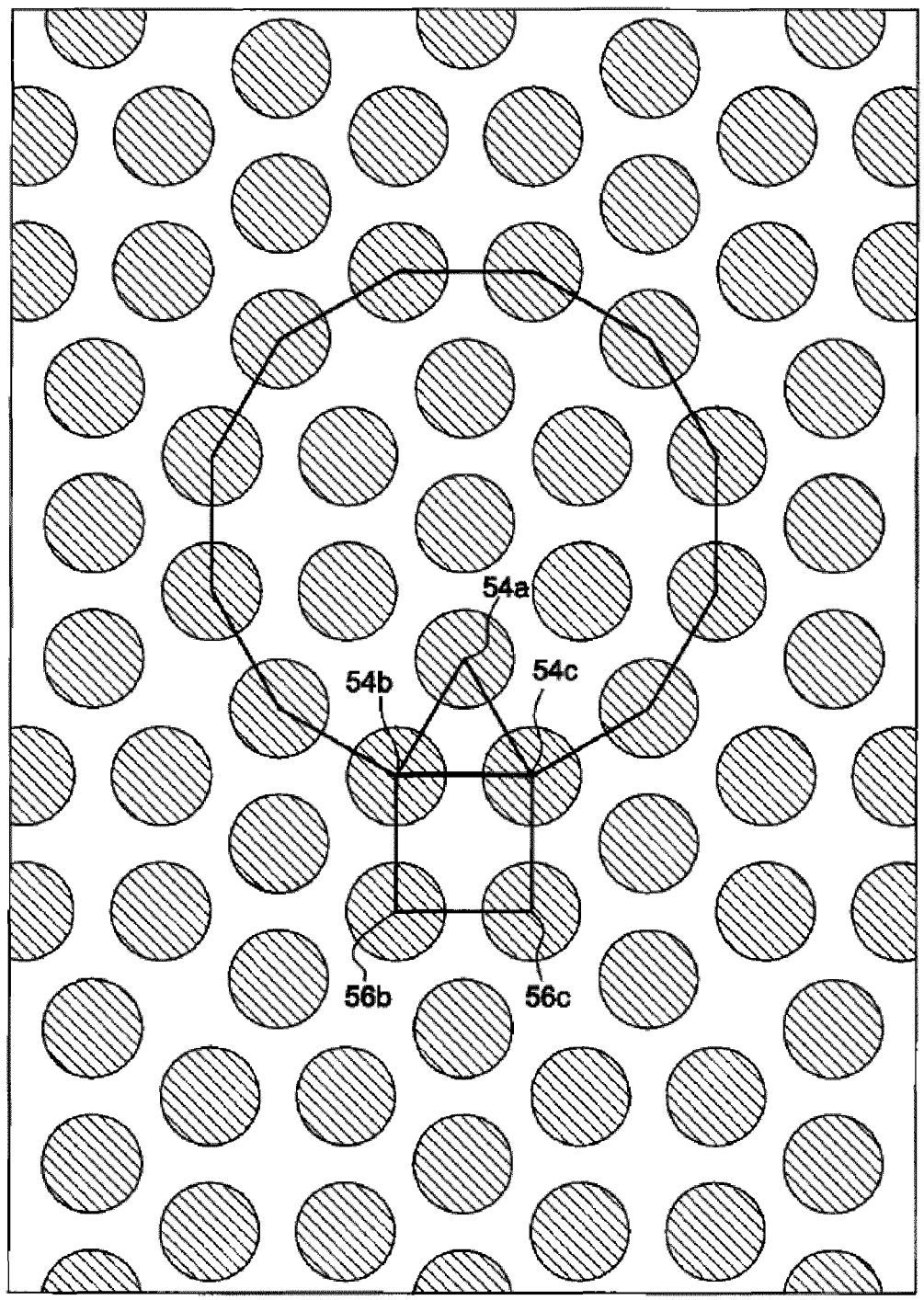
FIG. 7 is a top view of a diffraction grating comprising circular pads arranged according to an archimedean tiling.

Pads, for example, circular, textured at the lower surface 16 of the cover substrate 12 and positioned at each of the points according to the construction just described are illustrated in FIG. 7, wherein the patterns of various symmetries are materialized.

Figure 6:
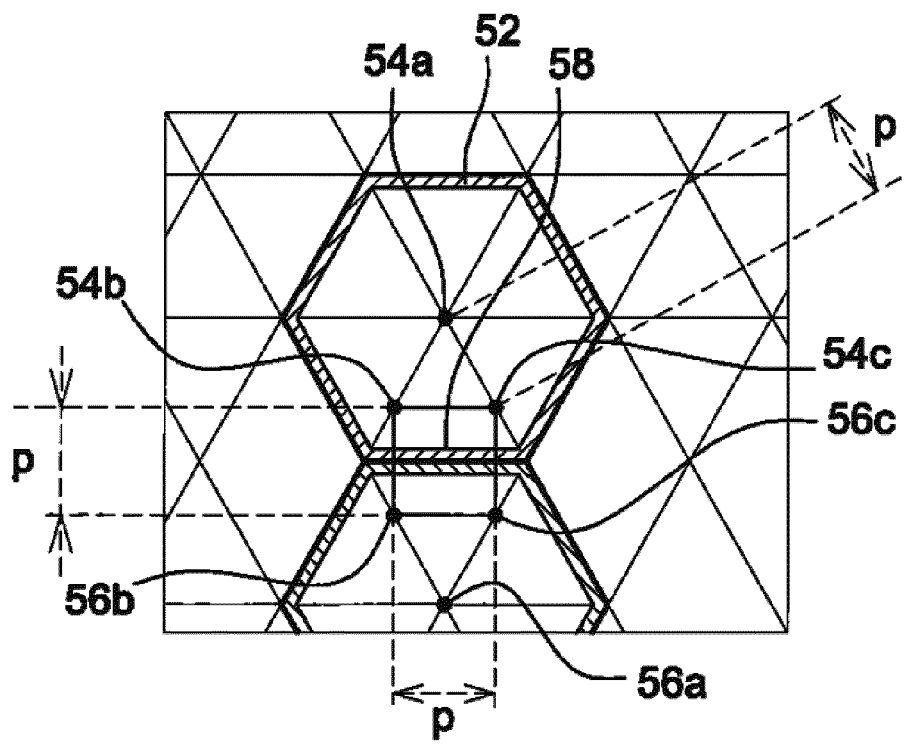
FIG. 6 is a view illustrating the three points of the mesh of the archimedean tiling based on the tiling of FIG. 5.

The period of a grating based on an archimedean tiling should be understood hereinafter as parameter p of FIG. 6 which corresponds to the distance between two points of the construction, that is, between the centers of two neighboring pads.

The Penrose tiling enables to form a two-dimensional grating having its order of symmetry 5 or 10 generally maintained.

The grating based on the Penrose tiling may be constructed according to the known multigrid method. The multigrid method provides a two-dimensional grating with a symmetry of order N (N=5 for the Penrose tiling):

- a set of parallel regularly spaced-apart straight lines is constructed;
- a center of rotation is set on one of the lines;
- the line network is repeated by rotation around the center of symmetry according to the next angle, which provides a symmetry of order N=5:360°/5=72°.
- the first line network is then replicated by a second rotation according to the same center of rotation with an angle equal to (360°/5)×2=144°.
- the first line network is then replicated according to the same principle for the following angles: (360°/5)×3 and (360°/5)×4.
- by construction, the intersection points of the straight lines then correspond to the nodes of a grating having a symmetry of order 5.
- the pads of the grating used for the present invention are then placed on each of the nodes to obtain a grating of pads having a symmetry of order 5.

The shortest distance between parallel lines (along the direction perpendicular thereto) used to construct the grating can be considered as the period of this grating based on a Penrose tiling.

The features of diffraction grating 21 enabling to set the attenuation range will now be described in further detail.

In the case of a grating 21 obtained by texturing the lower surface 16 of the cover substrate 12, the first diffracted order appears under normal incidence for the following wavelength:

$$\lambda = p \cdot (n_s + n_a) \quad (1)$$

where:
$\lambda$ is the wavelength in vacuum;
p is the period of grating 21;
$n_s$ is the refraction index of the cover substrate 12; and
$n_a$ is the refraction index of space, for example, air or vacuum. In the following, $n_a=1$.

To obtain an advantageous diffraction filtering, a period sufficiently high for the grating to efficiently diffract in the spectral band to be attenuated, that is, for wavelengths ranging between y and 8 micrometers, should be selected. However, the grating period must not be too high, to limit diffraction in the spectral band where the transmission is to be optimized, that is, for wavelengths ranging between 8 and 14 micrometers.

In practice, an efficient diffraction filtering is obtained with a grating 21, without significantly affecting the transmission for higher wavelengths, when period p of the grating causes the appearing of the first diffracted orders at a wavelength in cover substrate 12 ranging between 1.1 and 1.4, and typically approximately equal to 1.25 times the cut-on wavelength in cover substrate 12 desired for the grating.

To best attenuate the radiation of wavelengths smaller than 8 micrometers, for example, period p of grating 21 is thus selected so that the first diffraction order approximately appears around 10.5 micrometers in vacuum.

Thus, the diffractive attenuation over the spectral band of wavelengths ranging between y and 8 micrometers becomes significant and the transmission for the spectral band of wavelengths ranging between 8 and 10 micrometers is little affected since the diffracted intensity remains limited over this spectral band.

When the grating 21 is formed on the window 11, the process comprises a second step illustrated on FIG. 3b where the spacer 14a is bonded with the lower surface 16 of the cover substrate 12 by anodic bonding 13. Anodic bonding 13 is a bonding process able to seal glass to either silicon or metal by heating and application of an electric field. The cover substrate 12 and the spacer 14a are put into atomic contact. A first electrode is mounted in contact with the spacer 14a and a second electrode is mounted in contact with the cover substrate 12. A weight can be placed on the top of the spacer 14a to ensure good contacting pressure. The cover substrate 12 and the spacer 14a are put in a chamber with a temperature comprised between 250 and 500° C. Then, an electric field, for example with 200-1000 DC voltage, is applied between the cover substrate 12 and the spacer 14a. The sandwich between the two electrodes forms an effective parallel plate capacitor. Consequently, the voltage applied to the electrodes pulls the cover substrate 12 and the spacer 14a into intimate contact with the induced electrostatic force generated between the electrodes. The bonding of silicon and glass is actually accomplished by the formation of an extremely thin layer of $SiO_2$ interface as the result of the applied electric field. This process can take 10 to 40 minutes in a chamber at 450° C. with 1000 V DC.

In the embodiment of FIGS. 3a-3f, the spacer 14a is made of glass, such as for example Mempax or Borofloat from Schott AG, or Pyrex by Corning; SD2 from Hoya. The spacer 14a has preferably a height greater than 75 micrometers, for instance in the range from 150 to 250 micrometers.

The spacer 14a can be structured before or after the anodic bonding 13 of a spacer 14a onto the lower surface 16 of the cover substrate 12 at the periphery of the optical window 11. A laser structuration can be used to structure the spacer 14a before the anodic bonding 13 and a wet etching can be used to structure the spacer 14a after the anodic bonding 13. The structuration permits to form the lateral walls of the hermetic package.

When the spacer 14a is structured and bonded to the cover substrate 12, the cover substrate 12 is then transferred onto the base substrate 18. In this step, the base substrate 18 has at least one microbolometer 19 suspended thereon, as illustrated on FIG. 3c.

As illustrated on FIG. 3d, the cover substrate 12 can be bonded on the base substrate 18 using a metal bonding 15 for instance an AuSn join using a temperature of 300-320° C. during 5 min.

Upper surface 17 of the cover substrate 12 is then provided with a multilayer interference filter 20, designed to attenuate the general optical transmission of window 11 over a first wavelength range between 2 and x micrometers, with x in the range from 2 to 8 micrometers. The limited width of this range especially enables to provide an interference filter having a limited number of layers, and as a corollary a limited number and size of defects as compared with an interference filter designed to attenuate the transmission of the window over the full interval from 2 to 8 micrometers. For instance, x is equal to 5.

Figure 3F:
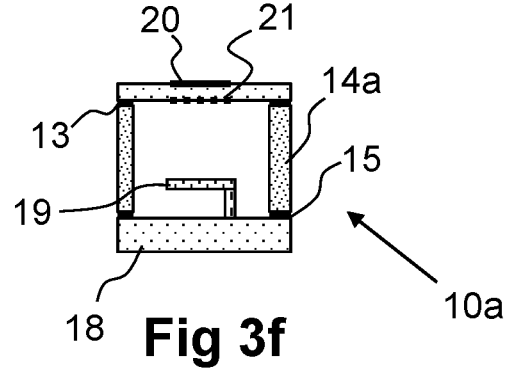
Figure 4A:
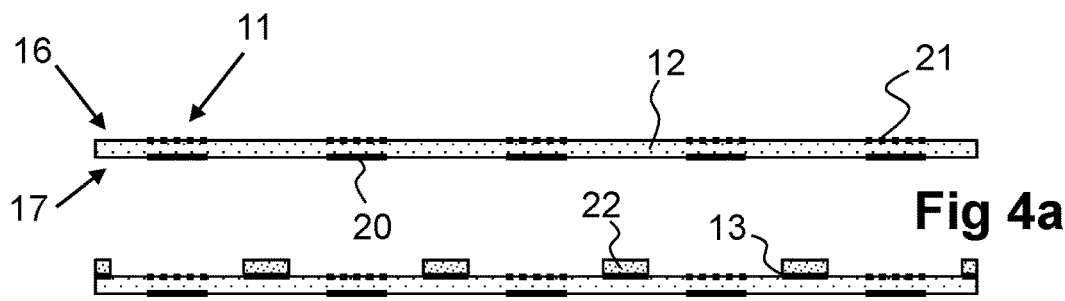
FIGS. 4a-4g illustrate the steps of formation of an infrared detector according to a second embodiment of the invention.
Figure 4B:
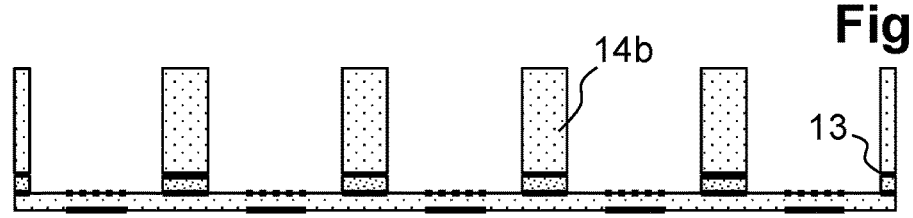
Figure 4C:
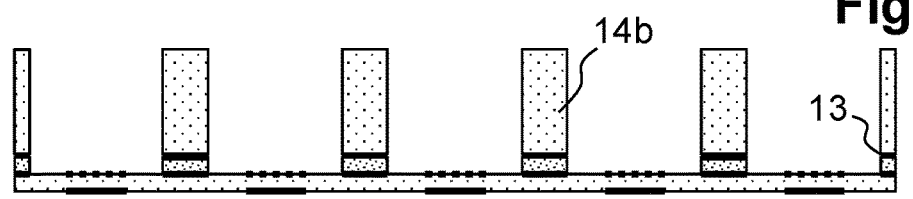
Figure 4D:
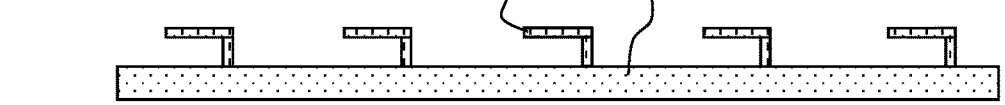
Figure 4E:
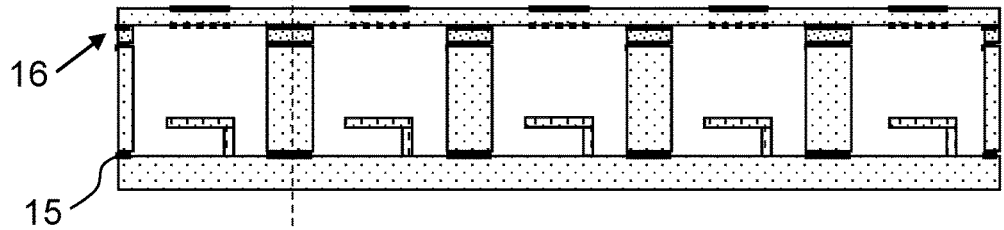
Figure 4F:
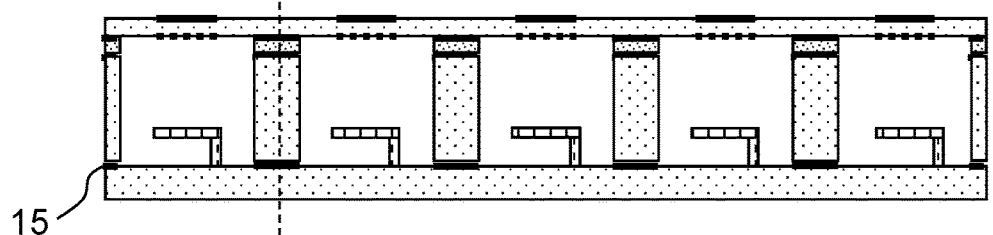
Figure 4G:
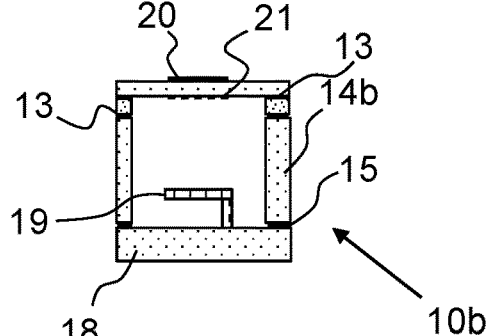

To form the infrared detector 10a, the cover substrate 12, the spacer 14a and the base substrate 18 can be cut as illustrated on FIG. 3f.

In another embodiment, the spacer 14b can be made of silicon, as illustrated on FIGS. 4a-4g. In this embodiment, the cover substrate 12 including the window 11 is bonded with an insert 22 made of glass. As illustrated on FIG. 4b, the insert 22 is bonded on the cover substrate 12 with a first anodic bonding 13. Then, a second anodic bonding 13 is used to bond the spacer 14b on the insert 22. Alternatively, the insert 22 is bonded on the spacer 14b before being bonded to the cover substrate 12 by means of an anodic bonding.

Whatever the embodiment, the process of the invention always involves at least one anodic bonding 13 realized on the lower surface 16 of a cover substrate 12 including a periodic diffraction grating 21.

Thus, the invention enables the implementation of a spacer 14a-14b with an anodic bonding 13 to increase the volume of a hermetic package without risking degrading the performance of the optical window 11 because the periodic diffraction grating 21 can resist to the process of anodic bonding 13.

The invention claimed is:

1. A method of forming an infrared detector comprising the steps of:
   definition of an optical window in a first substrate, called cover substrate;
   anodic bonding of a spacer onto a lower surface of said cover substrate at the periphery of said optical window to form the lateral walls of a package;
   transfer of said cover substrate provided with said spacer onto a second substrate, called base substrate, having at least one microbolometer suspended thereon; and
   hermetic bonding of said spacer onto said base substrate to form a hermetic package around said at least one microbolometer;
   wherein the step of definition of the optical window comprises forming a multilayer interference filter or a periodic diffraction grating on an upper surface of said optical window, and a periodic diffraction grating on the lower surface of said optical window;
   the multilayer interference filter or the periodic diffraction grating of the upper surface being configured to attenuate the incident radiation in a first wavelength interval in the range from 2 to x micrometers;
   the periodic diffraction grating of the lower surface being configured to attenuate the incident radiation in a second wavelength interval in the range from y to 8 micrometers; with x in the range from 2 to 8 micrometers and y smaller than or equal to x.

2. The method of forming an infrared detector according to claim 1, wherein the spacer has a height greater than 75 micrometers.

3. The method of forming an infrared detector according to claim 2, wherein the spacer has a height in the range from 150 to 250 micrometers.

4. The method of forming an infrared detector according to claim 1, wherein at least one periodic diffraction grating exhibits an Archimedes or Penrose lattice.

5. The method of forming an infrared detector according to claim 1, wherein the spacer is made of glass, the hermetic bonding of said spacer onto the base substrate integrating a metal bonding.

6. The method of forming an infrared detector according to claim 5, wherein the spacer is structured before the anodic bonding step onto said lower surface of said cover substrate with a laser structuration.

7. The method of forming an infrared detector according to claim 5, wherein the spacer is structured after the anodic bonding step onto said lower surface of said cover substrate with a wet etching.

8. The method of forming an infrared detector according to claim 1, wherein the spacer is made of silicon, said spacer being bonded on the lower surface of the cover substrate by means of an insert made of glass, said insert being deposited on the lower surface of said cover substrate and bonded onto said spacer by means of an anodic bonding, the hermetic bonding of said spacer onto the base substrate corresponding to a metal bonding.

9. The method of forming an infrared detector according to claim 1, wherein the cover substrate is made of silicon.

10. The method of forming an infrared detector according to claim 1, wherein the optical window has a thickness in the range from 700 to 800 micrometers.

11. An infrared detector comprising: a base substrate having at least one microbolometer suspended thereon; walls formed by a spacer made of glass, bonded onto said base substrate; and a cover substrate bonded onto said spacer by anodic bonding; said cover substrate having an optical window comprising: a multilayer interference filter or a periodic diffraction grating on an upper surface of said optical window; and a periodic diffraction grating arranged on a lower surface of said optical window; said multilayer interference filter or the periodic diffraction grating of the upper surface being configured to attenuate the incident radiation in a first wavelength interval in the range from 2 to x micrometers; said periodic diffraction grating of the lower surface being configured to attenuate the incident radiation in a second wavelength interval in the range from y to 8 micrometers; with x in the range from 2 to 8 micrometers and y smaller than or equal to x.

12. An infrared detector comprising:
   a base substrate having at least one microbolometer suspended thereon;
   walls formed by a spacer made of silicon, bonded onto said base substrate;
   an insert made of glass bonded onto said spacer; and
   a cover substrate bonded onto said insert by anodic bonding; said cover substrate having an optical window comprising:
   a multilayer interference filter or a periodic diffraction grating arranged on an upper surface of said optical window; and
   a periodic diffraction grating arranged on a lower surface of said optical window;
   said multilayer interference filter or the periodic diffraction grating of the upper surface being configured to attenuate the incident radiation in a first wavelength interval in the range from 2 to x micrometers;

said periodic diffraction grating of the lower surface being configured to attenuate the incident radiation in a second wavelength interval in the range from y to 8 micrometers; with x in the range from 2 to 8 micrometers and y smaller than or equal to x.

* * * * *